United States Patent [19]

Sanderson

[11] 4,400,846
[45] Aug. 30, 1983

[54] TAPE CLEANING APPARATUS

[75] Inventor: Robert A. Sanderson, Graham, Tex.

[73] Assignee: Graham Magnetics, Inc., North Richland Hills, Tex.

[21] Appl. No.: 307,850

[22] Filed: Oct. 2, 1981

[51] Int. Cl.³ .............................................. B08B 5/04
[52] U.S. Cl. ..................................... 15/306 A; 15/308
[58] Field of Search ................. 15/306 R, 306 A, 308, 15/345, 346

[56] References Cited

U.S. PATENT DOCUMENTS

| | | | |
|---|---|---|---|
| 3,091,794 | 6/1963 | Pillsbury | 15/308 |
| 3,370,314 | 2/1968 | Morello | 15/308 |
| 3,620,230 | 11/1971 | Foret | 15/308 X |
| 4,159,579 | 7/1979 | Hoddinott et al. | 15/306 A X |
| 4,197,811 | 4/1980 | Nelson et al. | 15/306 A X |

Primary Examiner—Chris K. Moore
Attorney, Agent, or Firm—Andrew F. Kehoe

[57] ABSTRACT

Apparatus for cleaning magnetic tape and like webs, comprising a series of sharp scraping edges for cleaning said web, said edges forming the periphery of a series of air ports through which a vacuum is drawn laterally across the bottom of the web. Thus the apparatus can be utilized to perform a novel cleaning process wherein the cleaning edges are constantly washed with air. Air-distributing means is provided whereby there is no situs on the tape being cleaned on which loose debris can be immobilized in a zone of stagnant air during its entire passage through the apparatus.

7 Claims, 4 Drawing Figures

TAPE CLEANING APPARATUS

BACKGROUND OF THE INVENTION

This invention relates to an apparatus for refurbishing magnetic tape by removal of adherent and loose dirt from the tape.

Magnetic tape is extensively used as a means to magnetically record, store, and retrieve information for use in audio and digital-data applications. A particularly sensitive application is that wherein digital data is stored for use in the maintenance of computerized information systems. The tape so utilized should have a carefully monitored, preferably error-free, character. Even when the tape is not certifiably error-free, it is desirable that the number, and statistical distribution of errors be known so that particular tape can be matched to the requirements of particular information-storage applications.

When a tape is newly manufactured this data is readily obtainable using, for example, a tape-certifying apparatus available from Graham Magnetics Incorporated under the trademark Inspector IV. However, once a tape is used it becomes subject to error-inducing wear from contact with read and write heads, and it becomes subject to contamination with error-inducing debris or dirt. Some of the dirt is only loosely attached and is readily removable. Other dirt adheres to the surface from which it must be scraped. Thus, there have been developed such tape-cleaning apparatus as, for example, that described in U.S. Pat. No. 3,370,982 to Hayunga. That patent describes the use of scraper bars to remove dirt from tape being refurbished. Also known to the prior art is the use of a series of sharp edges formed about the periphery of apertures in thin metal sheet. The tape to be cleaned would be sucked into scraping contact with the metal sheet by vacuum.

A number of problems were presented by the prior art cleaning apparatus and processes. The scraping edges wore too quickly because of the abrading contact with, e.g., the iron-oxide-filled surface of the tape. Moreover, the cleaning and refurbishing action often was less effective at and near the edges of the tape than on the major area.

Consequently, the present inventor sought to provide an improved means to clean magnetic tape and other such web materials which require a scraping action.

SUMMARY OF THE INVENTION

It is a principal object of the present invention to provide an improved long-wearing web-cleaning apparatus of the scraper type.

It is a another object of the invention to provide an improved process for refurbishing webs, especially magnetic tape.

It is a particular object of the invention to provide a process which achieves improved cleaning while achieving a refurbished magnetic tape of unexpectedly excellent data-retention characteristics.

Other objects of the invention will be obvious to those skilled in the art on their reading this disclosure.

The above objects have been achieved by the construction of scraping apparatus which utilizes a plurality of scraping edges (preferably forming a cleaning table across which the tape is carried) and means to supply a constant supply of cleaning fluid, e.g. air, across the scraping edges proximate to the surface of the tape being cleaned.

In the more advantageous forms of the invention the cleaning air is sucked upwardly through apertures terminating just below the cleaning edge structure, thence laterally across the scraping surface to achieve a cleaning action thereon. Thus air and any dirt are then carried away from the tape by the shortest possible route, i.e. laterally, toward the side of the web.

In preferred embodiments of the invention, cleaning air washes over the lateral edges of the tape before being sucked into a dirt disposal stream. This air can be suitably provided from the ambient air at the top of the tape being cleaned.

It has been found very easy to properly balance the flow in a suction line to provide a sufficiently-balanced contact of the tape being cleaned with the cleaning head so that both effective tape cleaning and dirt removal is achieved by the suction.

Another advantageous feature of the invention is to provide cleaning air supply means which assures different fluid pressure profiles will be encountered along the cleaning table by each portion of the surface of the tape. Such a means is conveniently achieved by offsetting a plurality of air-supply apertures both across and along the cleaning pathway to be travelled by the tape or any other effective air-flow diversion procedure. This construction has been found to reduce substantially the probability of a speck of dirt being carried past the cleaning station in a stagnant air zone without being subjected to a lateral displacement into the dirt-disposal flow stream.

An additional feature of the invention is the unexpectedly advantageous effect that the air flow pattern, including flow across the outer edges of the tape, has in maintaining the edges of the tape in excellent contact with the cleaning means. This flow will be shown in a downward mode in the description set forth below.

In sum, the invention provides means to clean magnetic tape at state-of-the-art velocities of 200 inches per second and faster. Edge cleaning of the tape is more efficient. The cleaned tape is generally superior and, in magnetic tape applications, this superiority can be demonstrated by statistical testing methods known to the art. These processing advantages are achieved utilizing a novel apparatus which is itself particularly advantageous because it may be easily sized to meet the requirements of small cassette-type apparatus. Even more importantly, the apparatus is self-cleaning, self-sharpening and requires little maintenance.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention and the principles thereof and will be able to modify it and embody it in a variety of forms, each as may be best suited in the condition of a particular case.

IN THE DRAWINGS

Figure 1:
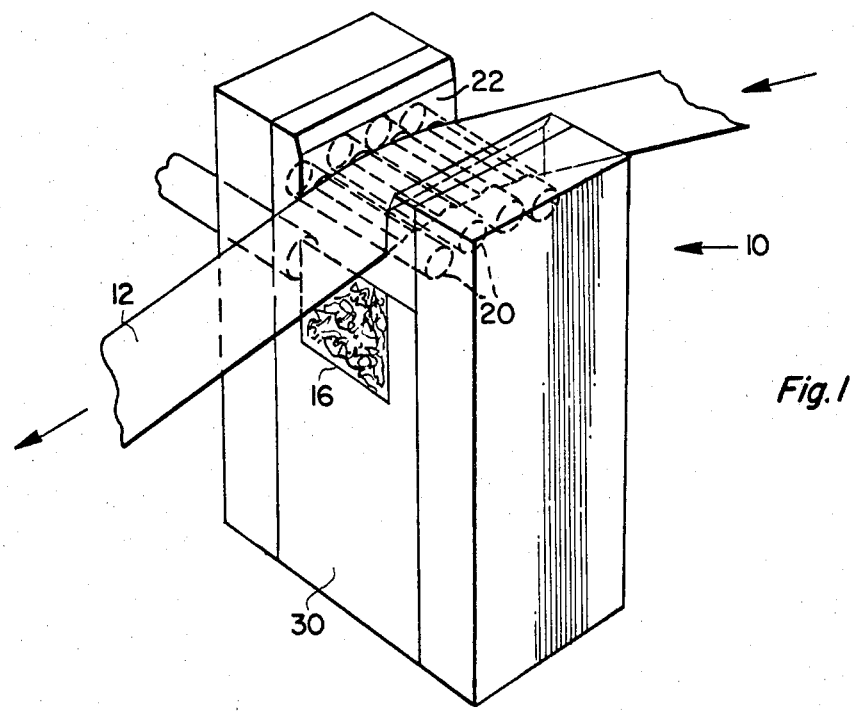
FIG. 1 is a perspective view of a scraper bar structure of the invention.
Figure 2:
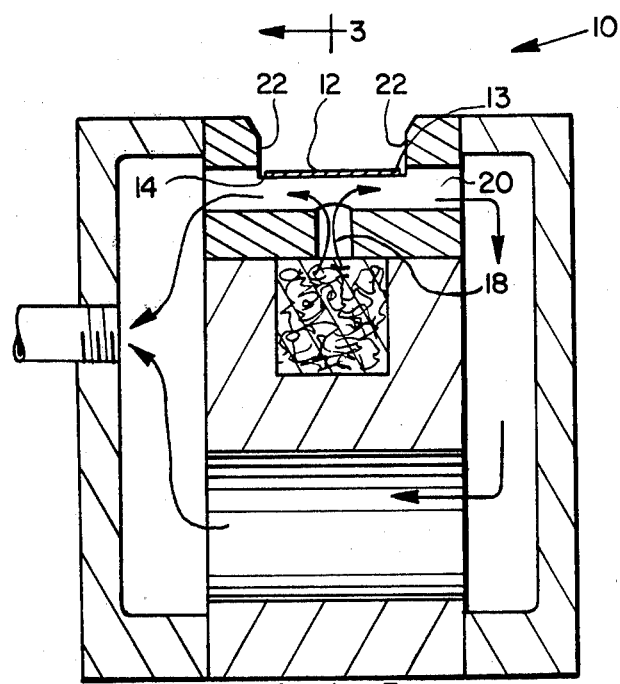
FIG. 2 is an elevation in section of the cleaning apparatus of the invention with the scraper bar set into a housing conduit member. The view is taken facing the direction of movement of the web being processed.
Figure 3:
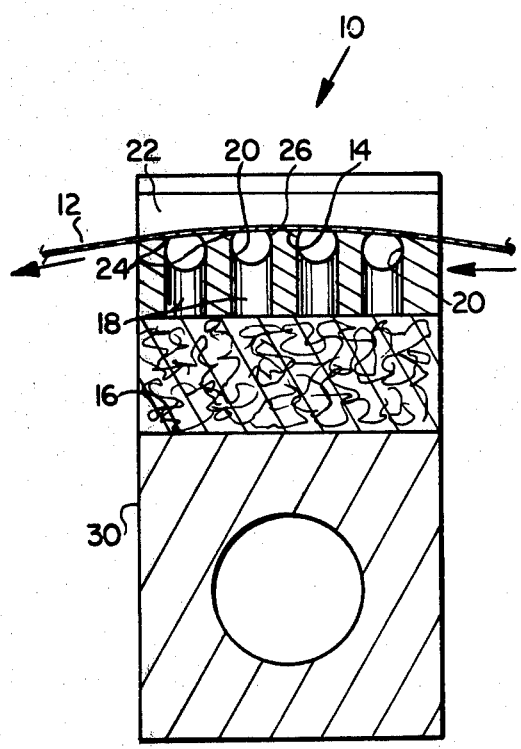
FIG. 3 is a side view in section of the apparatus of FIG. 2.
Figure 4:
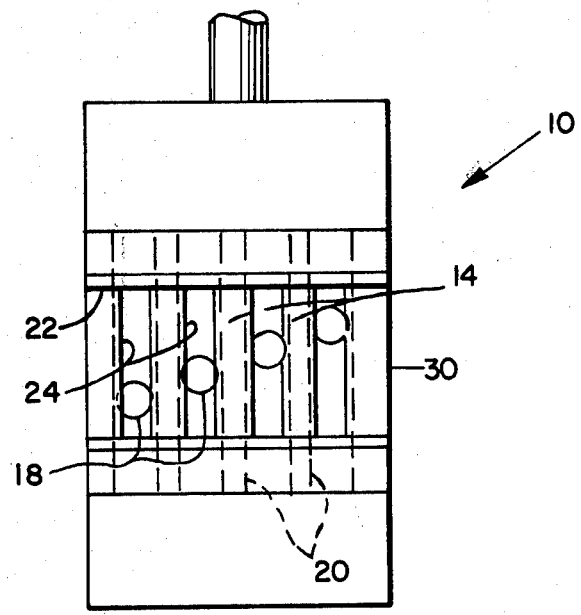
FIG. 4 is a plan view of FIG. 3.

FIGS. 1, 2 and 3 are somewhat schematic in that they indicate only centrally-located suction ducts 18. FIG. 4 shows a plan view of a device with ducts 18 arranged to provide a particularly advantageous air flow.

The general scheme of the invention is seen with reference to FIGS. 2 and 3. FIG. 3 illustrates a tape-cleaning apparatus 10 with a magnetic tape 12 being carried over the surface of a slightly convex cleaning table 14. Air is supplied to the lower surface of table 14 from below through a major horizontal air duct 16 and four vertical ducts 18. Each vertical air duct 18 terminates in a minor horizontal air duct 20. Ducts 20 are spaced apart and they intersect with the vertical sidewalls 22 (which may also be viewed as guide walls) such that they extend, in the vertical dimension, from below said table surface to above the table surface. Thus ducts 20 form passage means, through vertical sidewalls 22, from air sucked from above and below table surface. Edges 13 of the tape are constantly washed with air flowing to ducts 20 from above the tape as the bottom, or front, surface of the tape is washed from below.

Scraping edges are provided at the intersection of ducts 20 with table 14. These scraping edges 24, which form an angle of about 60° when measured normal to the table surface and in a plane parallel to the direction of tape 12, provide means to scrape dirt and debris from the web being processed. It is to be noted that other such edges 26 will be encountered by tape 12 if it is run in the reverse direction. Thus, an additional advantage of the invention is that it can be utilized to process webs equally well in either direction without the need to move or adjust any part of the tape cleaning apparatus. Both scraping edges being used at any one time, and those useful for reverse-direction processing are always washed by cleaning fluid during operation of the apparatus.

It is to be noted that the apertures in the processing table 14 need not be rectangular nor need they be of uniform size. They may be formed as slits or ellipses or other such shapes. However, the illustrated rectangular shape is believed to be highly convenient and to result in the best overall distribution of sharpening and cleaning forces when the tape is pulled snugly against the table by mechanical means (not shown in the drawings because they form no novel part of the present invention), and is processed with the tensioning of about eight ounces.

With particular reference to FIG. 2, it is noted that an integral monolithic machined element 30 forms the aforesaid ducts, table and side walls, and also comprises inlet air ducts 18 through which air is sucked into ducts 20 and an outlet air conduit 34.

Machined member 30 is mounted within a housing member 40 which, with member 30, forms means to direct the cleaning fluid during its passage through the apparatus. Thus, air pulled into the system from the top proceeds through ducts 20 through either side wall 22 and to fluid exit port 34 either directly via a space 42 between members 30 and 40 or via exit port 34, space 44 and conduit 36. The vacuum source, forming no unique aspect of the invention, is not shown in the drawings.

An air filter 50 is normally positioned in inlet duct 32 to prevent contamination of the tape with any contaminants, e.g. oil, mist, or dust, which may find their way into the system.

In the scraping tool shown in FIG. 1, the following construction features have been found to be desirable when cleaning iron-oxide-based magnetic tape at operating speeds of 200 inches per second.

The cleaning table has a convex arch having a radius of about 6.7 inches. It has a surface finish of about 8 root mean square (rms) and a width of about 0.53 inches. The point of intersection of the sidewall 22 with the table is slightly rounded, e.g. to a 0.005 inch maximum radius. The ducts 20 are of a diameter of about 0.15 inch and they too are lapped to an 8 rms finish. The self-sharpening feature makes it possible to form the device from any number of matarials, such as hardened tool sheet, ceramics or tungsten carbide, depending on the particular web-cleaning application one wishes to undertake. Use of less expensive, more easily abraded materials will require replacement far more frequently. More expensive materials can be used with assurance that they will have extraordinary service life which will justify higher initial investment.

It is to be particularly noted that the pressure flow path by which the cleaning fluid is brought into contact with the lower surface of the tape being cleaned is offset laterally across the table at different points along the path of the tape. The duct structure providing for this provides means to prevent a static (or neutral) flow condition at any point on the tape during the entire course of its path along the air table. Thus, it is highly improbable that any dirt particle could be carried along the entire air table without being pulled to left or right through the vertical wall apertures 22 and out of the system. Although there are a number of ways to achieve this effect, it has been found particularly useful to simply have the cleaning fluid pulled upwardly into ducts 20 through associated ducts 18 which are laterally offset from one another at different positions along the cleaning table, thereby providing the small dfferential in flow velocity and pressure required to achieve the desired effect.

In the following claims, the side of the web contacting the cleaning table is sometimes referred to as the front surface.

It will be apparent to those skilled in the art that various changes and further modifications of the invention may be made therein without departure from the spirit of the invention or from the scope of the appended claims.

What is claimed is:

1. A cleaning tool for use in fluid cleaning of a web passing thereover, said tool comprising a cleaning table provided with a plurality of apertures along the surface of said table, portions of perimeters of said apertures forming scraping means for cleaning said web, air ports in each sidewall adjacent to said table, adapted to be connected to a source of suction, said air ports extending above said table surface and forming means to conduct cleaning air impinging upon the top of said web laterally away from said web across each respective edge of said web, and wherein said air ports also extend below said table surface forming means to conduct cleaning air, impinging upon the bottom of said web from a source below said web, laterally away from said web across each respective edge of said web.

2. A tool as defined in claim 1 wherein said tool comprises air supply conduits to the lower portion of said table which conduits form during cleaning operation means to provide different pressure profiles across said table at different points along the length of the table.

3. A tool as defined in claim 1 or 2 wherein said table surface is slightly convex in shape.

4. A cleaning tool as defined in claim 1 or 2 wherein said scraping means is an edge formed of an angle of about 60° or less when measured normal to the surface of said table in a plane along the length of said table.

5. A tool as defined in claim 1 or 2 wherein said table surface is slightly convex and wherein said scraping means is an edge formed of an angle of about 60° or less when measured normal to the surface of said table in a plane along the length of said table.

6. A cleaning tool assembly comprising a cleaning tool as described in claim 1 or 2 comprising, in addition, suction means for pulling all said cleaning fluid into a common dirt disposal stream.

7. A cleaning tool assembly comprising a cleaning tool as defined in claim 1 comprising, in addition, suction means for pulling said cleaning fluid into a common dirt disposal system through a conduit system within a housing for said tool, and wherein said table surface is slightly convex, wherein said scraping-means is an edge of about 60° or less when measured normal to the surface of said table in a plane along the length of said table.

* * * * *